VOLTAGE CONTROLLED MICROWAVE PHASE SHIFTER
Filed Sept. 1, 1964
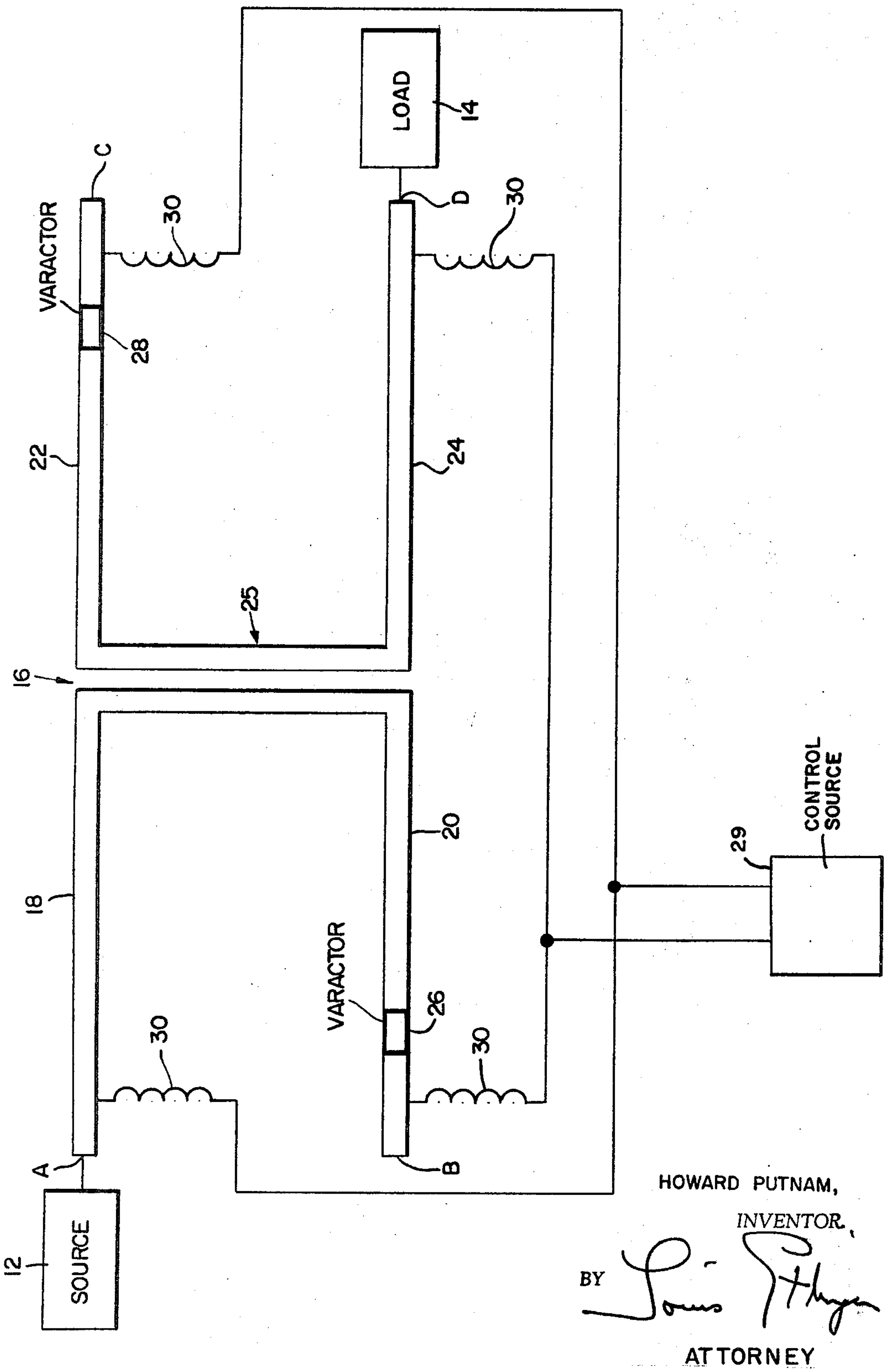
HOWARD PUTNAM,
*INVENTOR.*
BY [signature]
ATTORNEY United States Patent Office 3,400,342

Patented Sept. 3, 1968

3,400,342

VOLTAGE CONTROLLED MICROWAVE PHASE SHIFTER

Howard Putnam, Nashua, N.H., assignor to Sanders Associates, Inc., Nashua, N.H., a corporation of Delaware Filed Sept. 1, 1964, Ser. No. 393,527
3 Claims. (Cl. 333—31)

ABSTRACT OF THE DISCLOSURE

The present invention pertains to a phase shifter comprising the combination of a hybrid and variable reactance reflectors in the form of varactors. The varactors are serially connected in two arms of the hybrid and are spaced from the reactive open-end terminations thereof. The varactors provide reflections in conjunction with the reactive terminations of the arms wherein they are disposed. The phase of the reflections are readily varied by means of an external control voltage applied to the varactors. The varactors and the arms within which they are disposed receive energy applied to an input port of the hybrid and the energy is then reflected and delivered exclusively to an output port isolated from the input port.

This invention relates to a solid state high frequency phase shifter. More particularly, it relates to a phase shifter uniquely combining a hybrid with variable reactance reflectors. These reflectors provide reflections which are readily varied in phase by an external control voltage. The reflectors receive the energy applied to an input port of the hybrid and the hybrid delivers the reflected energy exclusively to an output port which is outerwise isolated from the input port.

The invention is particularly directed to the frequency range of 500–2000 megacycles, though its use is not limited to this range. In many applications, it is desirable to supply a signal having a readily controllable phase. In some cases, the phase is to be varied or modulated at a relatively high rate. In fact, the rate may often be beyond the capability of mechanical phase shifters often used in the past. Moreover, mechanical phase shifters suffer from many of the problems inherent in the use of moving parts in electrical circuits and in general they are not well adapted for control from remote locations.

An object of the present invention is to provide a phase shifter adapted for electrical control of the phase of high frequency signals.

Another object of the invention is to provide a phase shifter of the above type capable of high speed operation.

A further object of the invention is to provide a phase shifter of the above type characterized by the absence of moving parts.

Yet another object of the invention is to provide a phase shifter of the above type characterized by small size, reliable operation and adaptability for control from remote locations.

Other objects of the invention will in part be obvious and will in part appear hereinafter.

The invention accordingly comprises the features of construction, combination of elements and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawing which is a schematic diagram of a phase shifter embodying the invention.

In general, the invention makes use of a hybrid, an element having four ports and characterized by the transmission of energy from any one of the ports to two of the others, with the fourth port being isolated from the first. The input energy is generally divided equally between the two ports which receive it, though there is a phase difference of approximately 90 degrees between the components arriving at these two ports.

In accordance with the invention, one of the ports, which may be termed an input port, is connected to the signal source. The port which is isolated from the input port is connected to the load and therefore may be termed an output port. The other two ports, i.e. the ones which directly receive the input energy, are terminated in pure reactances preferably in the form of open circuits. In series with each of these ports is a varactor positioned a short distance therefrom.

The varactors are variable capacitors. Thus, some of the energy incident on each varactor is reflected therefrom; the remainder passes through to the reactive termination and is reflected from that point. The phase of the combined reflected energy in each case is a resultant determined by the proportion of the energy directly reflected by the varactor and the proportions reflected from the reactively terminated port and retransmitted through the varactor. The phase thus depends on the portion of the incident energy which passes through the varactor to the port associated therewith and this proportion in turn depends on the capacitance of the varactor. The capacitance is an electrically controllable parameter and thus direct electrical control varies the phase of the reflected energy. The energy reflected from the direction of the two varactors are recombined by the hybrid in such manner that they are fed exclusively to the output port.

A preferred form of hybrid is a three 3 db directional coupler. A coupler of this type may be constructed in a strip transmission line arrangement, with the varactors conveniently embedded in the line. This results in a compact unit which is also rugged and yet simple in design. Another feature is the relatively high efficiency of the unit, the only losses being the resistive loss in the varactors and the small losses associated with transmission lines in general. It is believed that the efficiency is enhanced by the series connection of the varactors in the hybrid arms.

As shown in the drawing, a phase shifter embodying the invention is used to vary the phase of energy delivered by a source 12 to a load 14. The phase shifter includes a parallel-line directional coupler, generally indicated at 16, having a 3 db coupling ratio. The coupler 16 is preferably formed from the inner conductors of strip transmission lines, and the conductors shown in the drawing are such conductors. The inner conductors are parallel to and spaced from a ground plane conductor, and preferably they are between a pair of ground plane conductors. A coupler of this type is shown on page 82 of "Handbook of Tri-Plate Components," published in 1956 by Sanders Associates, Inc. The ground plane conductors have been omitted from the drawing for the sake of clarity.

The coupler 16 has four ports, A, B, C and D at the outer ends of the arms 18, 20, 22 and 24, respectively. The arms extend from a coupling section indicated at 25. The input from the source 12 is fed to the input port A and the output for the load 14 is taken from the output port D. The arms 20 and 22 are preferably of the same length and varactors 26 and 28 are in series in these arms, spaced equidistantly from the ports B and C. The ports B and C provide open circuit terminations for the arms 20 and 22. The varactors may be controlled by applying control voltages from a control voltage source 29 through isolating chokes 30 connected for parallel control.

The port A is normally isolated from port D and the signal entering the port A is divided equally between the arms 20 and 22 by the coupler 16. It is then reflected from the varactors 26 and 28, as well as the ports B and C. Finally, the signal again passes through the coupler and out along the arm 24 to the port D.

The phase delay undergone by a signal passing from port A to port D depends on the distance it travels along the arms 20 and 22 before being reflected. If the varactors 26 and 28 have low impedances, almost all the reflection takes place at the port B and C, and phase delay is at a maximum. On the other hand, if the control voltage on the varactors is such as to maximize impedance, i.e., minimize capacitance, a large portion of the power is reflected from the varactors, and phase delay is at a minimum. Specifically, the net phase delay between input and output of the phase shifter is a resultant determined by (1) the distance between the varactors 26 and 28 and the ports B and C, and (2) the impedances of the varactors. Thus, by varying the control voltages on the varactors, the phase shift may also be varied continuously between its maximum and minimum values.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A phase shifter comprising
- (A) a parallel line directional coupler
  - (1) having
    - (a) a coupling section, and
    - (b) first, second, third and fourth arms extending from said coupling section, and
  - (2) providing isolation between said first and fourth arms,
- (B) means forming reactive terminations at the ends of said second and third arms remote from said coupling section,
- (C) said second and third arms being of equal length,
- (D) first and second varactors connected in series in said second and third arms respectively,
- (E) said varactors being equidistantly spaced from the respective terminations,
- (F) control means for simultaneously controlling the reactances of said varactors, said control means including first and second high impedance elements for connecting said varactors to a source of control voltage,
- (G) means connecting one end of said first impedance element to said first varactor,
- (H) means connecting one end of said second impedance element to said second varactor.

2. A phase shifter comprising
- (A) a parallel line directional coupler
  - (1) having
    - (a) a coupling section comprising first and second parallel conductors,
    - (b) first and second arms extending from said first conductor, and
    - (c) third and fourth arms extending from said second conductor, and
  - (2) providing isolation between said first and fourth arms,
- (B) said conductors and said arms being arranged as parts of first and second inner conductors in a strip transmission line construction,
  - (1) said first inner conductor including said first parallel conductor and said first and second arms, and
  - (2) said second inner conductor including said second parallel conductor and said third and fourth arms,
- (C) means forming an input port at the end of said first arm remote from said first parallel conductor,
- (D) means forming an output port at the end of said fourth arm remote from said second parallel conductor,
- (E) means forming first and second reactive terminations at the ends of said second and third arms remote from said coupling section,
- (F) said second and third arms being of equal length,
- (G) first and second varactors connected in series in said second and third arms respectively,
- (H) said varactors being equidistantly spaced from the respective terminations,
- (I) control means for simultaneously controlling the reactances of said varactors, said control means including
  - (1) first and second high impedance elements for connecting said varactors to a source of control voltage,
  - (2) means connecting one end of said first impedance element to said first inner conductor between said first varactor and said input port, and
  - (3) means connecting one end of said second impedance element to said second inner conductor between said second varactor and said output port.

3. The combination defined in claim 2 in which
- (A) said reactive terminations are open circuits
- (B) said control means includes third and fourth impedance elements,
  - (1) one end of said third impedance element being connected to said first inner conductor between said first varactor and said first termination, and
  - (2) one end of said fourth impedance element being connected to said second inner conductor between said second varactor and said second termination.

References Cited

UNITED STATES PATENTS

| | | | |
|---|---|---|---|
| 3,235,820 | 2/1966 | Munushian | 333—31 |
| 3,012,210 | 5/1961 | Negg | 333—10 |
| 3,146,413 | 8/1964 | Butler | 333—31 |
| 3,246,265 | 4/1966 | Smith-Vanz | 333—31 |
| 3,267,395 | 8/1966 | Keeling et al. | 333—10 |

HERMAN KARL SAALBACH, *Primary Examiner.*

C. BARAFF, *Assistant Examiner.*